United States Patent
Willis

Patent Number: 5,949,425
Date of Patent: Sep. 7, 1999

[54] TERRAIN REPRESENTATION WITH POLYGONAL SEAMS

[75] Inventor: Lee R. Willis, Livermore, Calif.

[73] Assignee: Terrain Experts, Inc., San Jose, Calif.

[21] Appl. No.: 08/976,823

[22] Filed: Nov. 25, 1997

[51] Int. Cl.$^6$ ............................................. G06T 11/40
[52] U.S. Cl. ..................... 345/428; 345/429; 345/423
[58] Field of Search ................................. 345/418, 419,
345/420, 425, 426, 427, 428, 429, 430,
431, 432

[56] References Cited

U.S. PATENT DOCUMENTS

| | | | |
|---|---|---|---|
| 5,471,572 | 11/1995 | Buchner et al. | 345/428 X |
| 5,577,960 | 11/1996 | Sasaki | 345/428 X |
| 5,694,331 | 12/1997 | Yamamoto et al. | 345/428 |
| 5,727,138 | 3/1998 | Harada | 345/420 |
| 5,731,817 | 3/1998 | Hahs, Jr. et al. | 345/420 X |
| 5,748,867 | 5/1998 | Cosman et al. | 345/429 X |
| 5,754,180 | 5/1998 | Kivolowitz et al. | 345/418 |
| 5,774,124 | 6/1998 | Itoh et al. | 345/423 |
| 5,774,596 | 6/1998 | Akiyama | 345/423 |
| 5,777,622 | 7/1998 | Lehr | 345/428 |
| 5,793,373 | 8/1998 | Sekine et al. | 345/420 |

*Primary Examiner*—Mark K. Zimmerman
*Assistant Examiner*—Cliff N. Vo
*Attorney, Agent, or Firm*—McDermott, Will & Emery

[57] ABSTRACT

A method for generating a graphical representation for two or more graphical entities that may be displayed at different levels of representation (e.g. resolutions) is described. A first tile is generated. Two or more representations for an interior region adjacent to an edge of the first tile ("seam representations") are generated. Each seam representation has the same peripheral shape (i.e. occupies the same region within the first tile), but a different interior configuration. A first representation of the interior region adjacent to the edge ("first seam representation") is displayed when an adjacent second tile is displayed adjacent to the edge. A second representation of the interior region ("second seam representation") is displayed when a third adjacent tile is displayed adjacent to the edge. The second adjacent tile may be associated with a level of detail that differs from the third adjacent tile. The first seam representation and the second seam representation are both formed of polygons. The vertices on the edge of polygons in each seam representation are shared by the vertices of the polygons in the respective adjacent tiles.

24 Claims, 15 Drawing Sheets

TERRAIN REPRESENTATION WITH POLYGONAL SEAMS

FIELD OF THE INVENTION

The present invention relates to the field of computer graphics, and in particular, to transitioning between levels of detail in displaying real-world objects in three dimensional renderings.

BACKGROUND OF THE INVENTION

In real-time three dimensional (3D) graphical simulation, real-world objects may be modeled as a set of polygons. For example, a set of six polygons may be used to model a house: four rectangles model the sides of the house, one rectangle models the roof, another rectangle models the door. The presentation of the modeled objects depends on the vantage point being simulated. For example, from a vantage point directly in front of the house, two rectangles of the model are displayed, i.e. the rectangle for the front face of the house and the rectangle for the door. As the vantage point is moved further away, the size of the rectangles used to model house is decreased to simulate the house being further away.

The vantage point that is being simulated is herein referred to as the eye view. An eye view in a real-time 3D graphical system may change over time and in response to user input. For example, a change in direction of an airplane brought about by user manipulation of a joy stick in a flight simulator causes the eve view to change. As the time elapses and the simulated plane moves, corresponding changes to the eye view occur.

Modeling real-world objects with polygons involves a trade-off between the number of polygons used to model objects and system performance. The greater the number of polygons used present real-world objects, the greater the detail presented. However, a greater number of polygons increases system load, and decreases response time and refresh rates.

One approach for managing the tradeoff is the "level of detail switching" approach. Under the level of detail switching approach, when an object is further away it is modeled at a coarser level of detail with a lesser number of polygons. When the object is closer, it is modeled at a finer level of detail with a greater number of polygons. For example, to model the house from an eye view that is further away, the house is modeled at a first level of detail using the six rectangles mentioned previously. As the eye view moves closer, the house is modeled at a second level of detail finer than the first, using a greater number polygons, e.g. additional rectangles to model windows.

The level of detail switching works well for discrete objects that occupy a small amount of space relative to the environment being simulated (e.g. houses, airplanes, cars). However, the approach is problematic for large objects, such as terrain.

When simulating terrain, it is desirable to present the terrain as a large continuous surface, with greater detail in the foreground and less detail in the background. However, presenting the terrain as a single object all of which is at a particular level of detail may present sufficient detail in the foreground but too much in the background. Furthermore, simulating all the terrain at a level of detail that was a relatively large number of polygons may cause an undesirable load on the computer system. Consequently, techniques have been developed to model terrain as a group of adjacent objects which are displayed as varying levels of detail.

One such approach is the grid approach. In the grid approach, the terrain is broken up into tiles, with multiple levels of detail representations for each tile. The tiles that are closer to the eye view are presented at a finer level of detail (i.e. modeled with a greater number of polygons), and tiles further away are presented at a coaster level of detail.

To give the terrain a continuous appearance, the edges of polygons in one tile that lie along an edge shared with another tile must coincide with the edges of polygons in the other tile. More specifically, any vertex of a polygon in one tile that lies on the shared edge must coincide with a vertex of polygon in the other tile. When the vertices along a shared edge of two tiles coincide in the manner, the shared edge is said to be matched.

For example, in FIG. 2A; tile 202 (not all polygons of tile 202 are shown) and tile 208 shared edge 220. Five vertices 222, lie on tile edge 220. Each of vertices 222 is a vertex of at least one polygon in tile 202 and of at least one polygon in tile 208. Likewise, all vertices 222 on tile edge 220 are vertices of at least one polygon in tile 202 and in tile 210.

To help maintain a continuous appearance, a given shared edge of a tile must be matched by any neighbor tile sharing the given shared edge regardless of the level of details at which the two tiles are displayed. One approach to ensuring that shared edges between tiles displayed at different levels of detail match is the "uniform-border-vertex" approach. Under the uniform-border-vertex approach, the vertices lying along an edge of a given tile coincide to the vertices lying on the corresponding edges of the other tiles that are different level of detail representations of the given tile.

For example, in FIG. 2B, tile 210 is a finer level of detail representation of tile 208 (not all polygons of tile 208 are shown). The vertices 222 of polygons in tile 210 that lie on tile edge 220 coincide with the vertices of polygons in tile 208 that lie on tile edge 220.

A drawback to the uniform border vertex approach is that, for some levels of detail, areas near the edge of the tile appear to be at a different resolution than areas in the interior. Furthermore, the appearance of a different resolution between the edge regions and interior regions makes the borders between tiles more visible and causes the appearance of walls running throughout the simulated terrain.

It is clearly desirable to provide a method of representing terrain with tiles whose resolutions do not appear to differ at the edge regions. It is further desirable to provide a method which reduces the appearance of walls running throughout the terrain.

SUMMARY OF THE INVENTION

A method for generating a graphical representation for two or more graphical entities that may be displayed at different levels of representation (e.g. resolutions) is described. According to one aspect of the invention, a first tile is generated. Two or more representations for an interior region adjacent to an edge of the first tile ("seam representations") are generated. Each seam representation has the same peripheral shape (i.e. occupies the same region within the first tile), but a different interior configuration.

According to another aspect of the invention, a first representation of the interior region adjacent to the edge ("first seam representation") is displayed when an adjacent second tile is displayed adjacent to the edge. A second representation of the interior region ("second seam representation") is displayed when a third adjacent tile is displayed adjacent to the edge. The second adjacent tile may be associated with a level of detail that differs from the third adjacent tile. The first seam representation and the second seam representation are both formed of polygons. The vertices on the edge of polygons in each seam representation are shared by the vertices of the polygons in the respective adjacent tiles.

According to another aspect of the invention, a seam representation is associated with the level of detail of the tile displayed adjacent to the seam representation. The seam representation may be associated with the level of detail of the displayed adjacent tile by associating the seam representation with spatial data and switching data (data representing range within which a graphical entity is in view) of the displayed adjacent tile.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for displaying graphical entities at multiple levels of detail is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
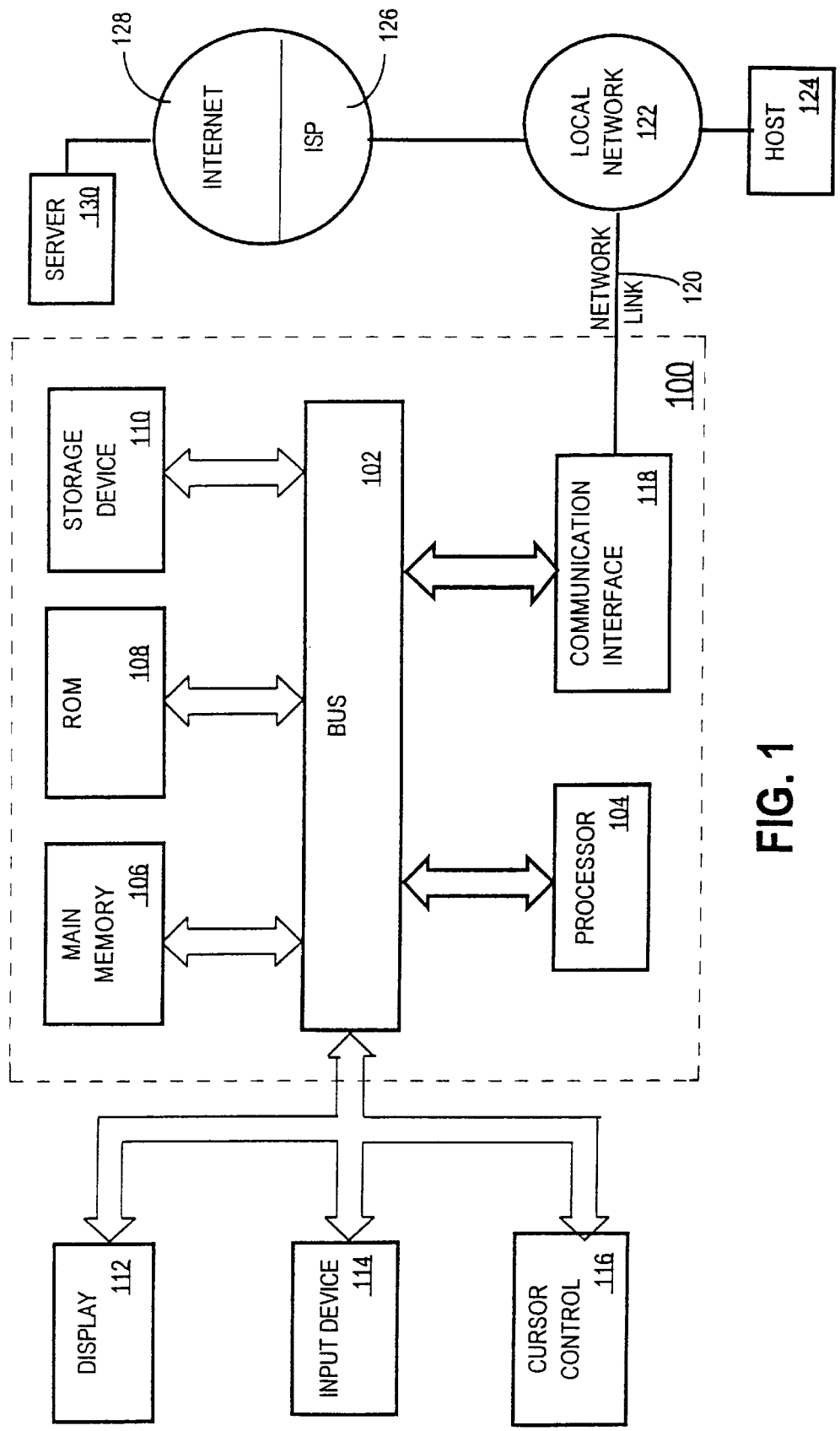
FIG. 1 is a block diagram of a computer system on which the present invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display mechanism 112, such as a video card connected to a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for displaying adjacent graphical entities at multiple levels of detail. According to one embodiment of the invention, the display of adjacent graphical entities at multiple levels of details is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for displaying adjacent graphical entities at multiple levels of detail with seams as described herein.

The received code may be executed by processor 104 as it is received, and/or stored in storage device 110, or other non-volatile storage for later execution. In this manner, computer system 100 may obtain application code in the form of a carrier wave.

SEAMS

According to embodiments of the present invention, the problems associated with the uniform approach to displaying terrain are reduced through the use of seams. A seam is a region in a tile that lies at an edge that is shared with other tiles and whose interior composition varies with the level of detail of the tiles adjacent to the edge. The other tiles that share a particular edge are referred to as adjacent tiles with respect to that edge. A seam has a representation that varies based on the level of detail at which an adjacent tile is displayed. Each representation has the same shape, i.e. the peripheral shape of a particular seam does not vary based on the level of detail at which an adjacent tile is displayed. For a particular tile, the seam serves as bridge that transitions to the level of detail of the adjacent tiles.

Figure 2A:
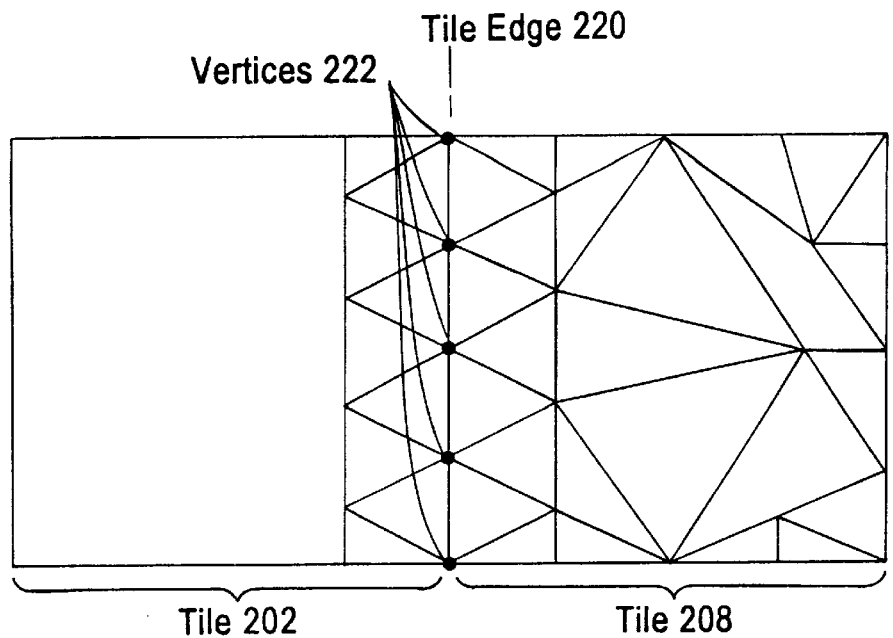
FIG. 2A is a block diagram depicting tiles generated under a conventional method.
Figure 2B:
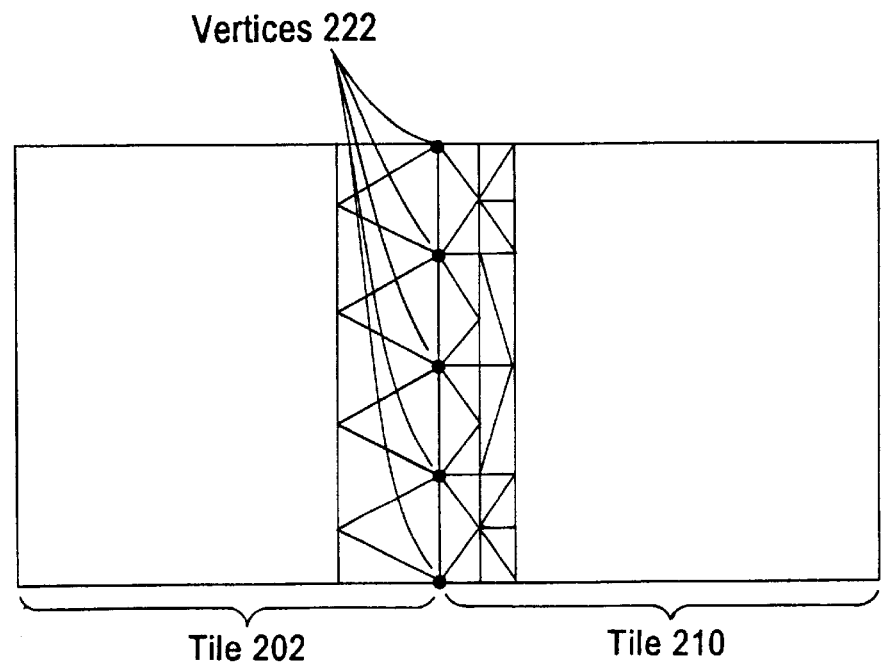
FIG. 2B is block diagram depicting a level of detail representation of an exemplary seam in a tile.
Figure 2C:
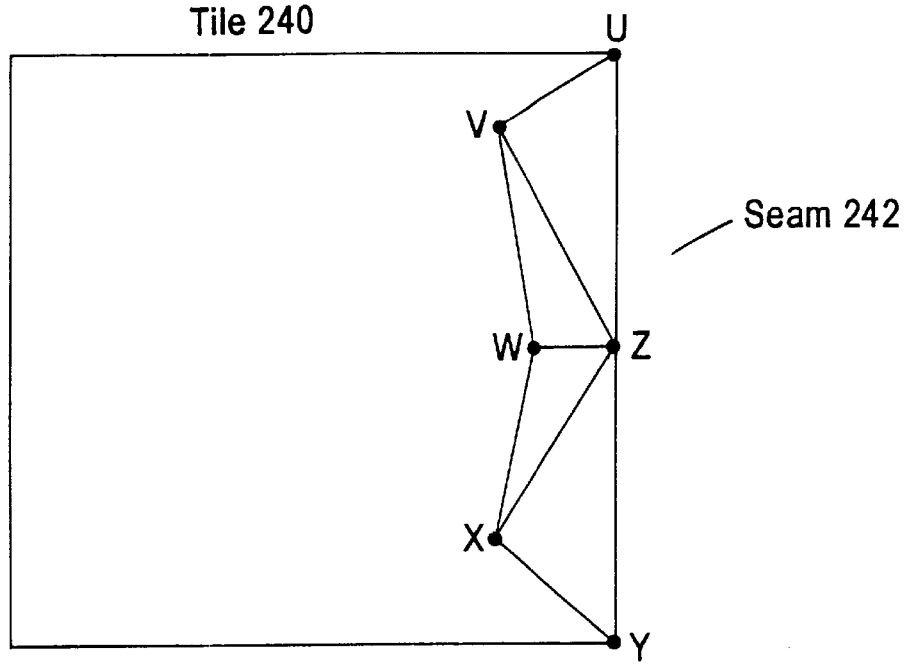
FIG. 2C is a block diagram depicting a level of detail representation of an exemplary seam in a tile.

FIG. 2C shows exemplary seam 242, defined by points u, v, w, x, y, and z within tile 240. The edge u-w-y is the interior edge of seam 242. For the purposes of explanation, edges are identified herein by the end points of the edge, and any points in between the end points necessary to identify the edge from other edges. Thus, edge u-w-y identifies the lines that connect points u, v, w, x, and y.

Figure 2D:
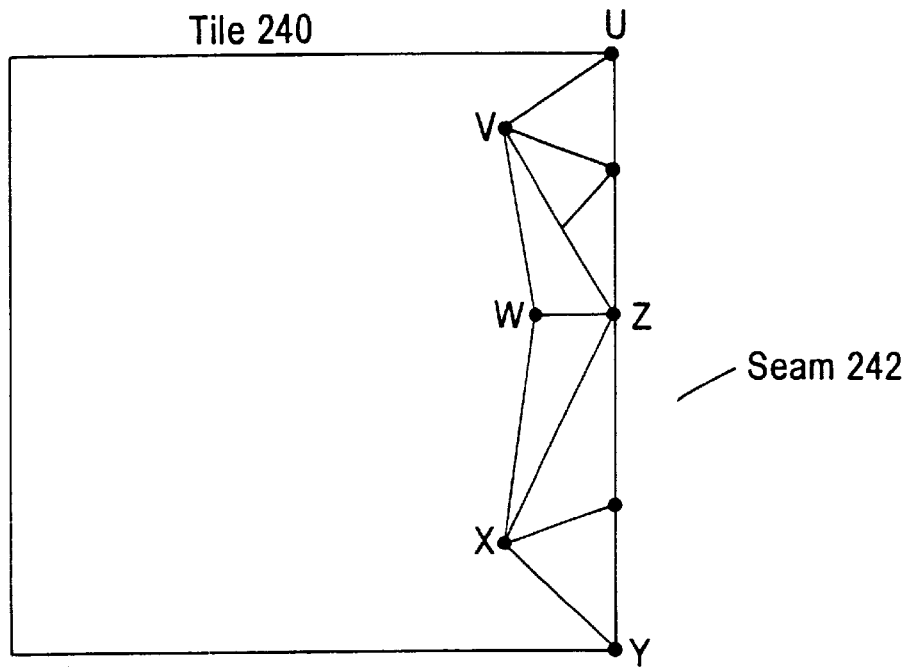
FIG. 2D is a block diagram depicting another level of detail representation of the exemplary seam shown in FIG. 2C.

FIG. 2D also shows the set of polygons that form the seam representation for seam 242 for bridging to an adjacent file rendered at level of detail 0. FIG. 2C shows the set of polygons that form the seam representation for seam 242 for bridging to an adjacent tile rendered at level of detail 1, a finer level of detail than level of detail 0. Significantly, the peripheral shape of the seam 242 is the same in both FIGS. 2C and 2D, but the number of vertices on edge u-z-y is greater in FIG. 2D than in FIG. 2C.

FUNCTIONAL OVERVIEW

Generating seams begins by generating a base terrain skin. A terrain skin is multiple level representation of terrain. A terrain skin includes a grid representation for each desired level of detail. A grid representation is a lattice of tiles that each represent a portion of the terrain at a particular level of detail. Each tile includes a set of polygons that model the region of terrain corresponding to the tile. A base terrain skin is a terrain that serves as a basis for generating seams.

After a terrain skin has been generated, seams are generated for one or more edges of one or more of the tiles in the base terrain skin. The peripheral shape of the seam is determined for a particular edge in accordance with the steps shown in FIG. 3. After the peripheral shape is determined, the seam representations for each level of detail at which adjacent tiles may be concurrently displayed along the particular edge are generated and stored in the scene graph generated for the base terrain skin.

A playback engine running a computer systems loads the scene graph into memory and uses the data in the scene graph it to render the graphical entities represented by the scene graph. The process of creating graphical displays, including simulations, based on data structures such as a scene graph is herein referred to as playback. Playback engines and scene graphs are well known to those skilled in the art.

SCENE GRAPHS

A scene graph is a data structure containing data about (1) graphical entities (e.g. a set of geometric shapes, such as polygons, modeling real-world objects) that are displayed in a graphical simulation, and (2) the manner in which each graphical entity is to be displayed. The scene graph includes a plurality of nodes. Each node is associated with one or more graphical entities, spatial location data, and switch in/switch out data ("switching data"). The switching data indicates the range of distance at which a graphical entity is visible and should therefore displayed, or, in other words, the distances at which the objects that the graphical entities model may be seen.

For example, a first graphical entity is associated with a first node and second graphical entity is associated with a second node. Both graphical entities model a house but at different levels of detail: the first at a coarser level of detail, and the second at a finer level of detail. The switching data of the first node indicates a more distant range, and the second a closer range.

For purposes of illustration, the present invention is described using triangles as an example of a polygon. However, it will be apparent to those skilled in the art that the present invention may be practiced with other types of polygons (i.e. n-sided polygons)

GENERATING THE BASE TERRAIN SKIN

In one embodiment of the present invention, a base terrain skin and the scene graph associated with the terrain skin is generated according to an approach referred to as the "quad-tree" approach. Under the quad-tree approach, a region of terrain represented by a tile at a coarser level of detail may be represented at the finer and next level of detail by four tiles. Furthermore, the scene graph is generated such that when the terrain skin is played back, a tile is never displayed at a level of detail that is more than one level different from the level of detail of any adjacent tile. Finally, the polygons in each tile are generated so that the shared edges between the tiles are matched. Techniques for generating a terrain grid according to the quad-tree approach and for generating grids formed of matched shared edges are well known to those skilled in the art and shall not be described.

Figure 4A:
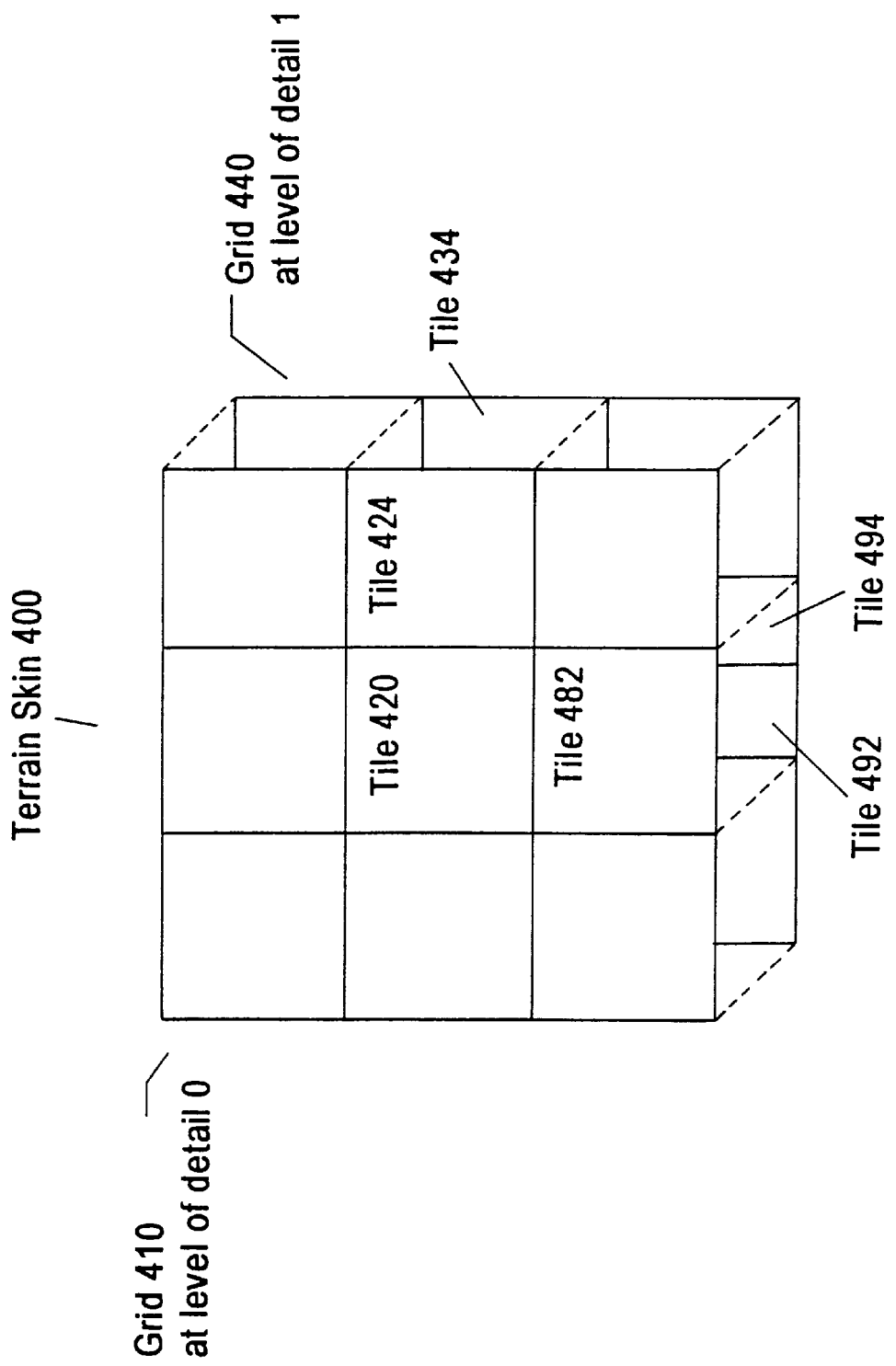
FIG. 4A is a block diagram depicting an exemplary terrain skin.

For example, FIG. 4A shows exemplary terrain skin 400 representing a region of terrain at two levels of detail. Terrain skin 400 is generated according to the quad-tree approach, and includes terrain grid 410 and terrain grid 440. Terrain grid 440 is a finer level of detail representation of terrain grid 410. Terrain grid 410 is at level of detail zero and terrain grid 440 is at a level of detail one. Tile 420, tile 424, and tile 482 are in grid 410 and thus are at level of detail zero. Tile 492, tile 494, and tile 434 are in grid 440, and thus are at level of detail one.

Figure 4B:
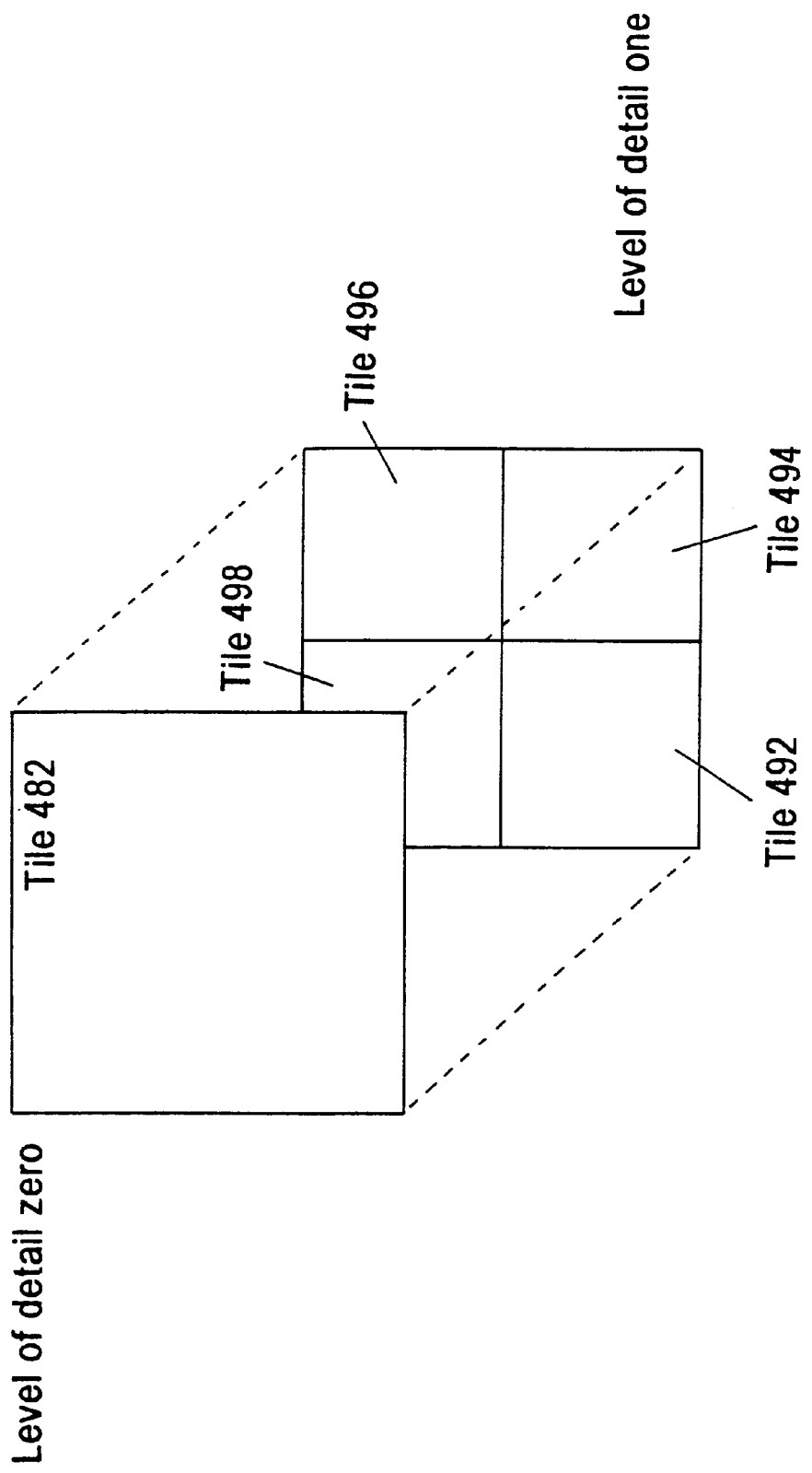
FIG. 4B is a block diagram depicting one tile at level of detail zero and tiles at level of detail one that are a more detailed representation the one tile.

FIG. 4B shows tile 482 and tiles used to represent the same terrain as tile 482 at a finer level of detail in accordance with the quad-tree approach. Specifically, the terrain represented by tile 482 is represented at a finer level of detail zero by tile 492, tile 494, tile 496, and tile 498.

TERMINOLOGY

Figure 3A:
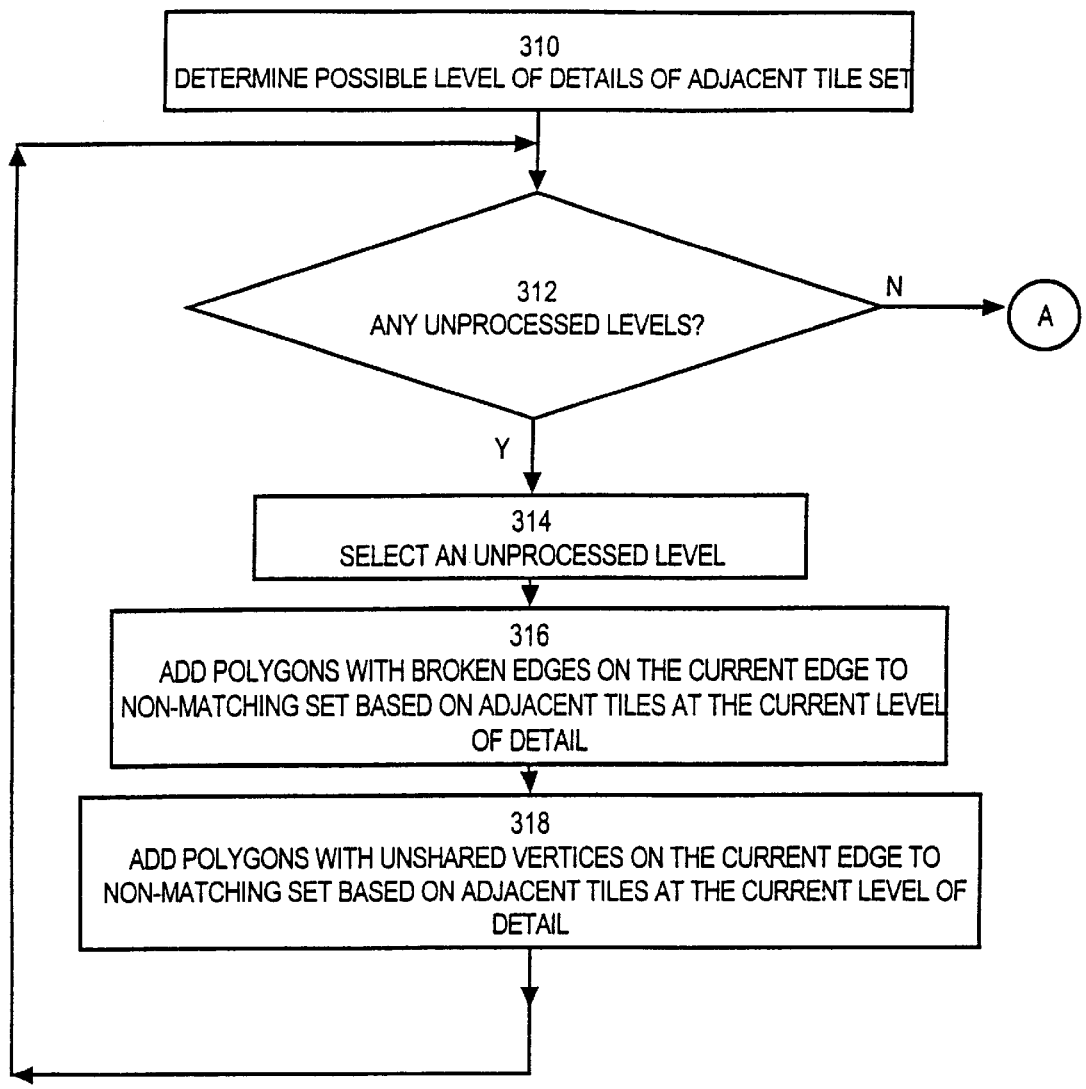
FIG. 3A is a flow chart showing the steps for generating a seam.
Figure 3B:
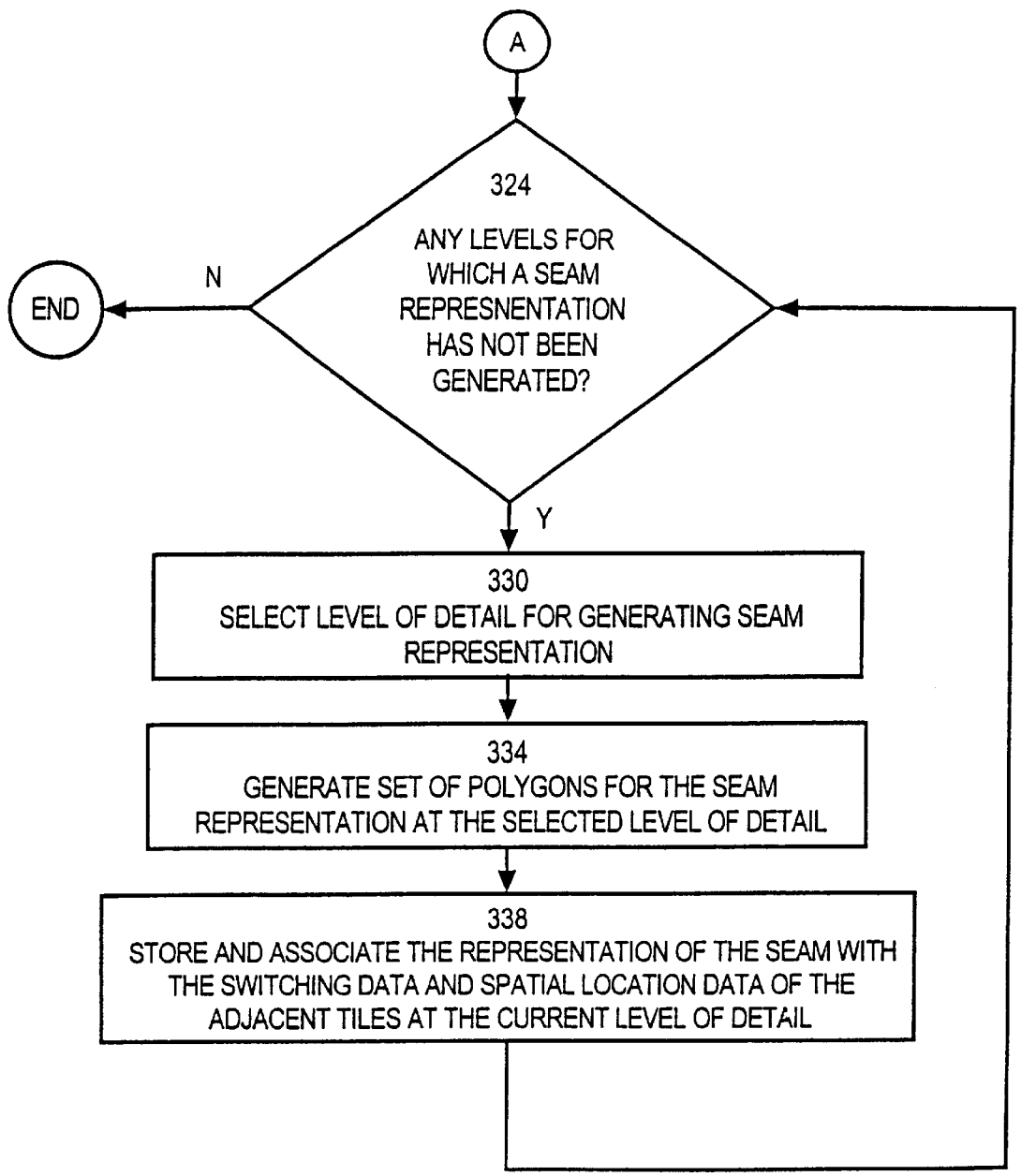
FIG. 3B is a flow chart showing the steps for generating multiple representations of the seam.

FIG. 3A shows the steps for determining the peripheral shape of a seam for a given edge of a tile. FIG. 3B shows the steps for generating a seam representation for each level of detail at which adjacent tiles may be concurrently displayed. During the description of FIGS. 3A and 3B, various terms are used. These terms are defined as follows:

The "current tile" is the tile for which one or more seams are being generated.

The "current edge" is the edge of the current tile for the which a seam being generated.

The "adjacent tile set" is the set of all tiles that may be displayed, at any level of detail, adjacent to the current edge.

An edge is considered to be a "broken" when a vertex of a polygon in an adjacent tile lies between the end points (vertices) of the edge. For example, in FIG. 5C, edge F-M-E of polygon 538 is broken because point M, a vertex of polygon 437 that lies between points F and E.

Figure 5A:
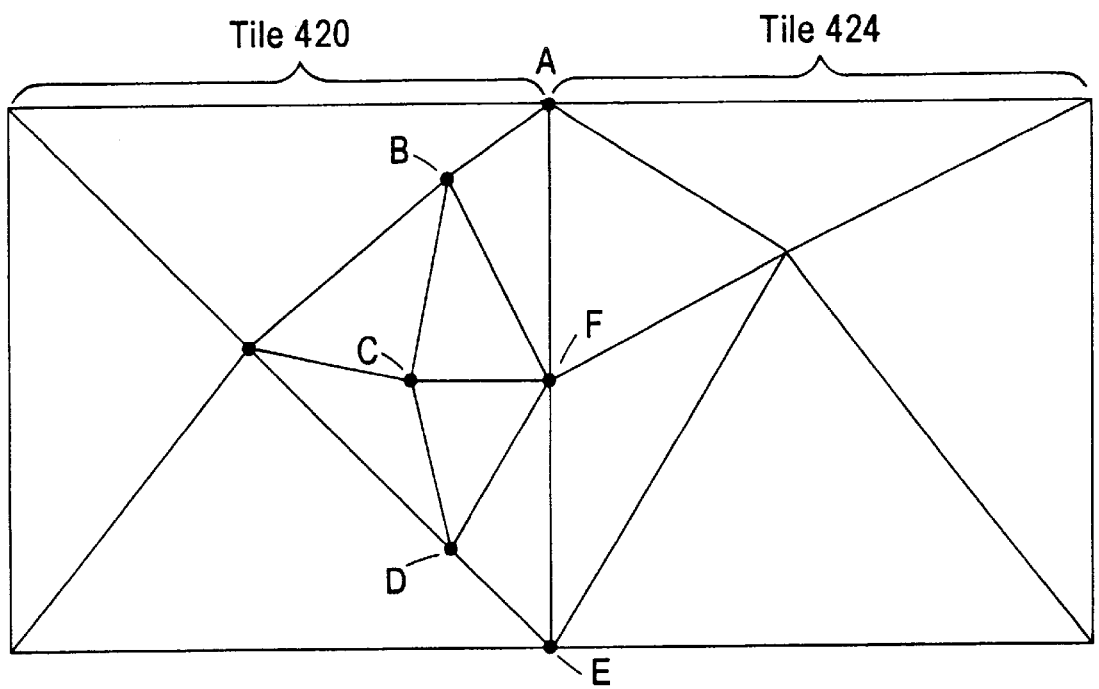
FIG. 5A is a block diagram showing an exemplary tile and an adjacent tile at the same level of detail.
Figure 5B:
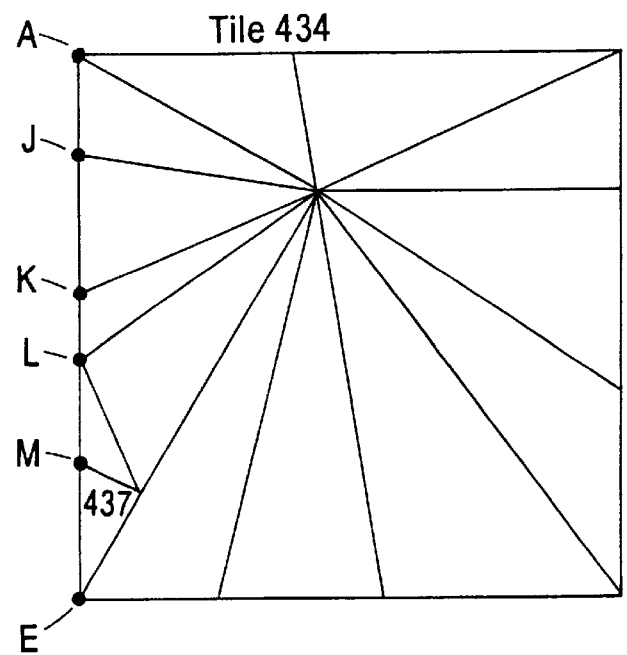
FIG. 5B is a block diagram showing another adjacent tile that is a level of detail one representation of the adjacent tile shown in FIG. 5A.

A vertex of a polygon in the current file is considered to be "shared" when the vertex is also a vertex of a polygon in an adjacent tile. For example, in FIG. 5C, point F, a vertex of polygon 534 and polygon 538, is not shared with any vertex in tile 434 (FIG. 5B). Therefore, vertex F is not a shared vertex.

A "non-matching polygon" is a polygon that:
(1) has an edge on a portion of the current edge, and the edge is broken by at least one vertex of a polygon in at least one file that belongs to the adjacent tile set, or
(2) has a vertex on the current edge, and the vertex is not shared by any polygon in the tiles that are adjacent to the current edge at one or more levels of detail.

The "non-matching set" is the set of non-matching polygons for the current edge.

A "seam representation" is a set of polygons that form a seam at a particular level of detail.

STEPS FOR DETERMINING THE PERIPHERAL SHAPE OF SEAM

FIG. 3A shows the steps for determining the peripheral shape of a seam. The shape of the seam is determined by determining the set of non-matching polygons with respect to the current edge. The region within the current tile that is occupied by the set of non-matching polygons constitutes the seam. The peripheral shape of this region is the peripheral shape of the seam.

Figure 5C:
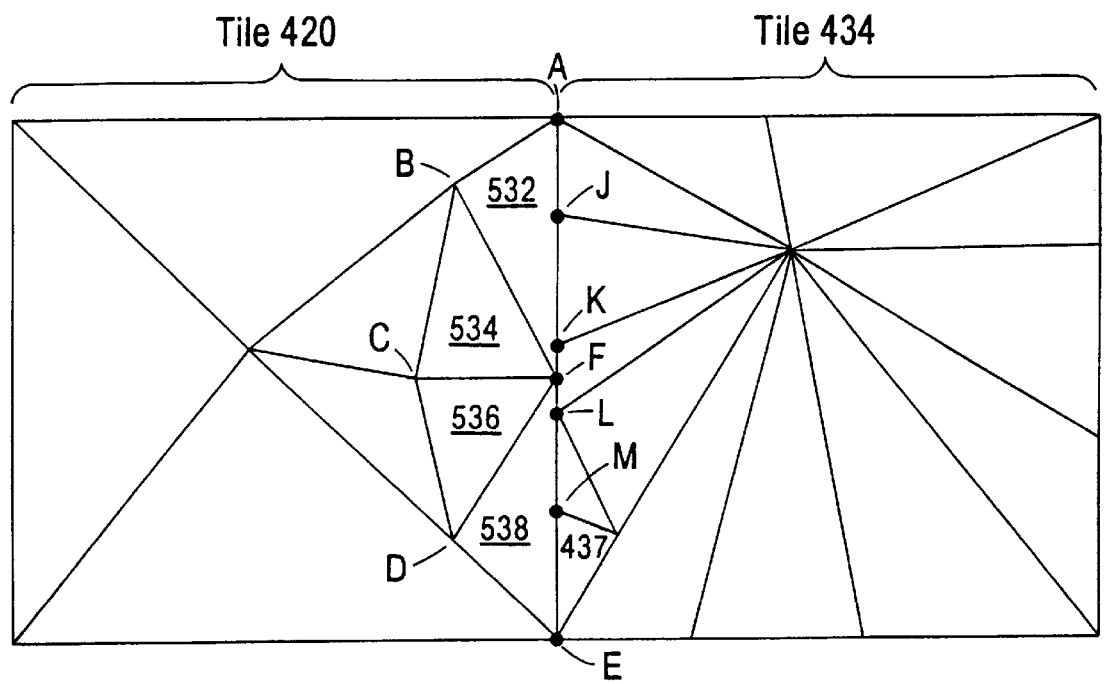
FIG. 5C is a block diagram depicting a non-matching set of polygons used to determine the shape of a seam.
Figure 5D:
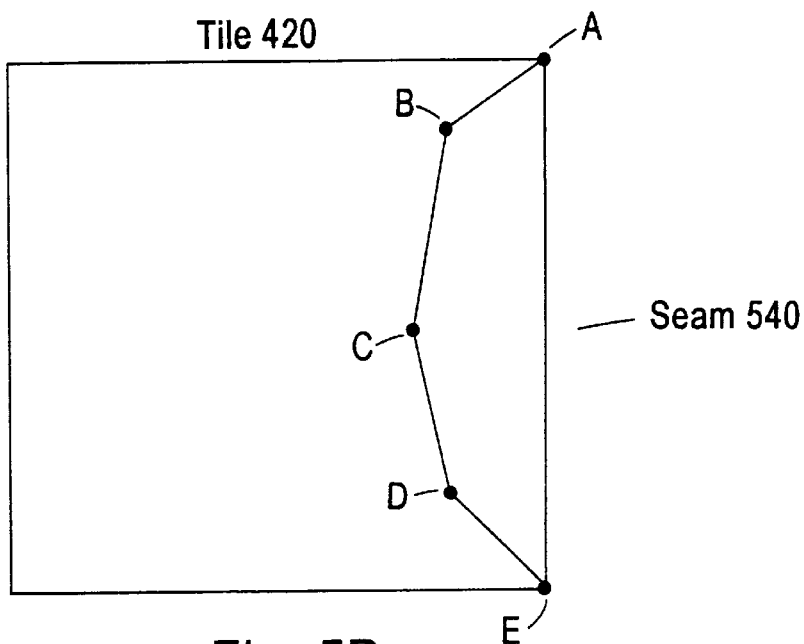
FIG. 5D is a block diagram depicting the shape of the seam within an exemplary tile.

The steps in FIG. 3A shall be explained with reference to FIGS. 5A–5F, which show tile 420 (FIG. 5A), tile 424, and tile 434 (FIG. 5B). Tile 420 and tile 424 are at level of detail zero, and tile 434 is at level of detail one. The current edge is edge A-F-E (FIG. 5A). Shown in FIGS. 5B and 5C are points A, J, K, L, M, E, which are vertices of the set of polygons in tile 434 that each have at least one vertex on edge A-F-E.

Referring to FIG. 3A, at step 310, the possible adjacent levels of detail of the adjacent tile set is determined. Control then passes to step 312.

In the present example, because the terrain skin is generated under the quad-tree approach, the level of details of the adjacent tile set is the level of detail of the current tile (level of detail 0) and the next and finer level of detail (level of detail one). Note that terrain skins may be generated using approaches where the possible levels of details of adjacent tile include levels of detail that are one or more levels coarser and one or more levels finer.

Steps 312, 314, 316 and 318 form a loop that is performed for each level of detail identified during step 310. Initially, the steps in the loop have not been performed for any level of detail identified during step 310, so all of the levels of detail are initially considered to be "unprocessed".

At step 312, it is determined whether there are any unprocessed levels of detail. If there are no unprocessed levels of detail, control flows to step 320 in FIG. 3B. Otherwise, control passes to step 314. In this example, two levels of detail (level zero and level one) where identified at step 310. Neither level of detail zero nor level of detail one has been processed, thus control passes to step 314.

At step 314, an unprocessed level of detail is selected. The unprocessed level that is selected is referred to as the current level of detail. Control then flows to step 316. In this example, it shall be assumed that the first unprocessed level that is selected is level of detail one.

Initially, the non-matching set for the current edge is empty (i.e. no polygons have yet been added to the non-matching set). At step 316, the polygons with broken edges on the current edge are added to the non-matching set based on the adjacent tiles at the current level of detail. Control then passes to step 318.

Referring to FIG. 5C, tile 434 is the only adjacent tile at the current level of detail (level of detail one). As mentioned above, edge F-M-E of polygon 538 is broken. Specifically, because points M and L lie between point A and point F, edge F-M-E of polygon 538 is broken. Thus, at step 316 polygon 538 is added to the non-matching set of polygons. Similarly, edge A-J-E is broken by vertices J and K. Therefore, polygon 532 is also added to the non-matching set. Control then passes to step 318.

At step 318, the polygons with vertices on the current edge that are not shared by polygons in the adjacent tiles at the current level of detail are added to the non-matching set. Control then passes to step 324.

In this example, point F is not shared by any polygon in tile 434. Because point F is a vertex of polygon 534 and polygon 536, polygon 534 and polygon 536 are added to the non-matching set for edge A-F-E during step 318. Control then returns to step 312.

At step 312, it is determined that there are unprocessed levels because level of detail zero has not been selected. Control flows to step 314, where level of detail zero is selected.

As mentioned earlier, tiles at the same level of detail in a terrain skin are generated such that their shared edges and vertices are matched (as shown in FIG. 5A). Thus, relative to tile 424, which is the same level of detail of the current tile, there are no polygons with broken edges to add to the unmatched set at step 316, and, there are no polygons with unshared vertices to add to the unmatched set at step 318. Thus control passes to step 312, where the determination is that there no unprocessed levels. Thus control flows to step 324 in FIG. 3B.

In certain environments, such as the one described above, it is known that the current edge will be matched at a particular level of detail. Under these conditions, that level can be skipped when determining the unmatched set. Thus, the loop defined by steps 312, 314, 316 and 318 may be skipped for level of detail zero when the current tile is a tile at level of detail zero.

GENERATING SEAM REPRESENTATIONS

FIG. 3B shows the steps for generating and storing seam representations for the current edge. When control arrives at step 324, the unmatched set for the current edge has already been determined. The seam is the region formed by the polygons that belong to the unmatched set. In the present example, the unmatched set includes polygons 532, 534, 536 and 538. Therefore, the seam for the current edge (A-F-E) is the region shown as seam 540 in FIG. 5D.

According to one aspect of the invention, the composition of seam 540 varies based on the level of detail of tiles that are adjacent to edge A-E. For example, at level of detail zero, the edge is composed of the polygons 532, 534, 536 and 538. However, when the one or more tiles that are adjacent to edge A-E are at a different level of detail, seam 540 may be composed of a completely different configuration of polygons. As mentioned above, a particular configuration of polygons used to form a seam is referred to as a seam representation.

Steps 324, 330, 334 and 338 form a loop for generating a seam representation. The loop is repeated for each level of detail at which tiles adjacent to edge A-E may be displayed.

At step 324, it is determined whether there are any levels of detail of the adjacent tile set for which a seam representation has not been generated. If there are no levels for which a seam representation has not been generated, execution of the steps ceases. Otherwise, control passes to step 330. In this example, because no seam representation has yet been generated for any level of detail of the adjacent tile, control passes to step 330.

At step 330, a level of detail for generating a seam representation is selected, and then control passes to step 334. In this example, the level of detail selected is level of detail one. Control passes to step 334.

At step 334, a set of polygons that form the seam representation corresponding to the level of detail selected in step 330 ("current seam representation") is generated. The set of polygons are generated such that the interior edge and exterior edge of the seam are matched. Such a set polygons can be generated using any number of methods well known in the art.

Figure 5E:
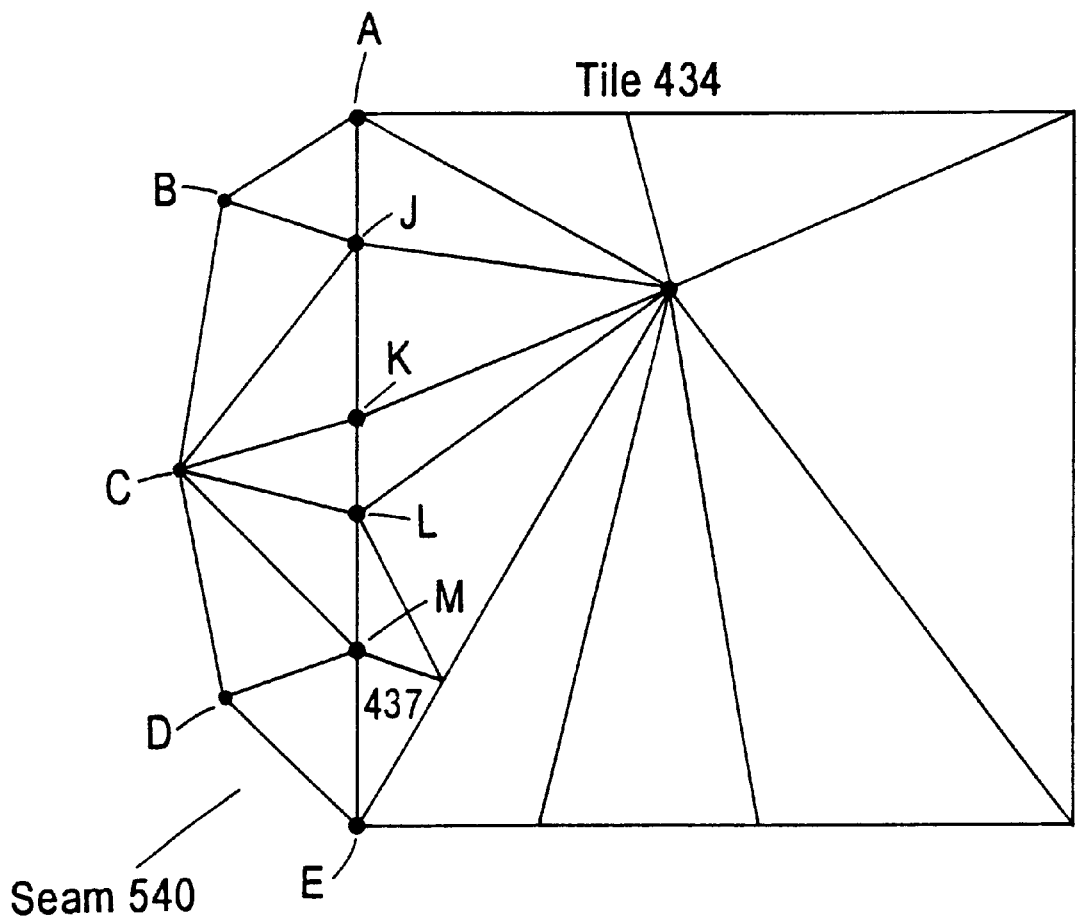
FIG. 5E is a block diagram depicting a level of detail representation of a seam that corresponds to an adjacent tile at level of detail zero.

In this example, the current seam representation is the seam representation for level of detail one. FIG. 5E shows a set of polygons that may be generated at step 334 to form the current seam representation. Points A, B, C, D, and E (the points on the interior edge of seam 540) are vertices of both polygons in the current seam representation and of polygons in the interior portion of tile 420 (i.e. the region not occupied by the seam). Thus the interior edge of seam 540 is matched. Likewise, points A, J, K, L, M, and E (the points on the shared edge A-K-M-E) are vertices of polygons in both seam 540 and adjacent tile 434. Thus, the shared edge A-K-M-E is matched. Control passes to step 338.

At step 338, the current seam representation is stored and associated with a node in the scene graph based on the switching data and spatial location data associated with the set of adjacent tiles at the current level of detail. Control then passes to step 324. In this example, the current seam representation is stored and associated with the node based on the switching data and the spatial location data of tile 434.

At step 324, it is determined that there is a level of detail of the adjacent tile set for which a seam representation has not been generated (i.e. level of detail zero). At step 330, the level of detail selected is level of detail 0.

Figure 5F:
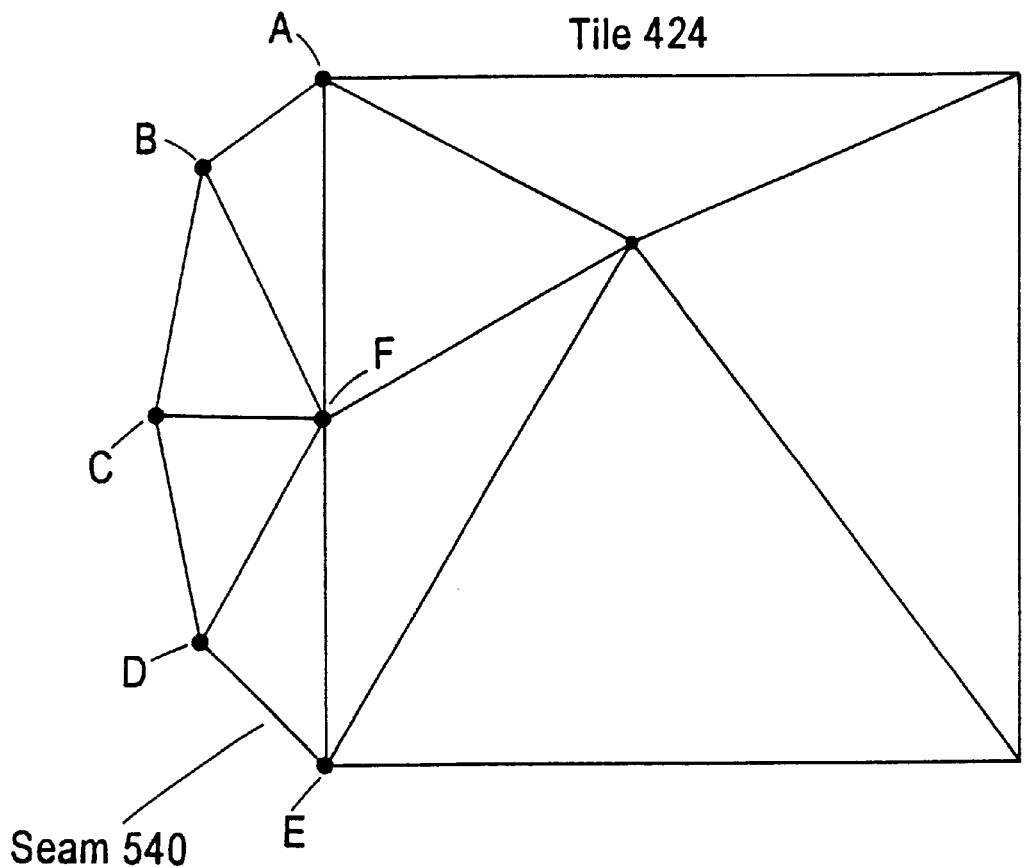
FIG. 5F is a block diagram depicting a level of detail representation of a seam that corresponds to an adjacent tile at level of detail one.

At step 334, the set of polygons generated for the current seam representation is shown in FIG. 5F. At step 338, the current seam representation is stored and associated with the node based on the switching data and the spatial location data of tile 424.

At step 324, it is determined that there is no level of detail of the adjacent tile set for which a seam representation has not been generated, therefore performance of the steps ceases.

SEAM REPRESENTATIONS BRIDGING TO MULTIPLE ADJACENT TILES

For purposes of illustration, the steps shown in FIGS. 3A and 3B have been illustrated with respect to a seam representation that bridges a tile at one level of detail to another tile at another level of detail of the same size and dimension. As mentioned previously, an adjacent tile may be represented at the next and finer level of detail by a set of multiple tiles. In such cases, the set of non-matching polygons is determined based upon the polygons in the one or more adjacent tiles in the set of multiple tiles.

Figure 6A:
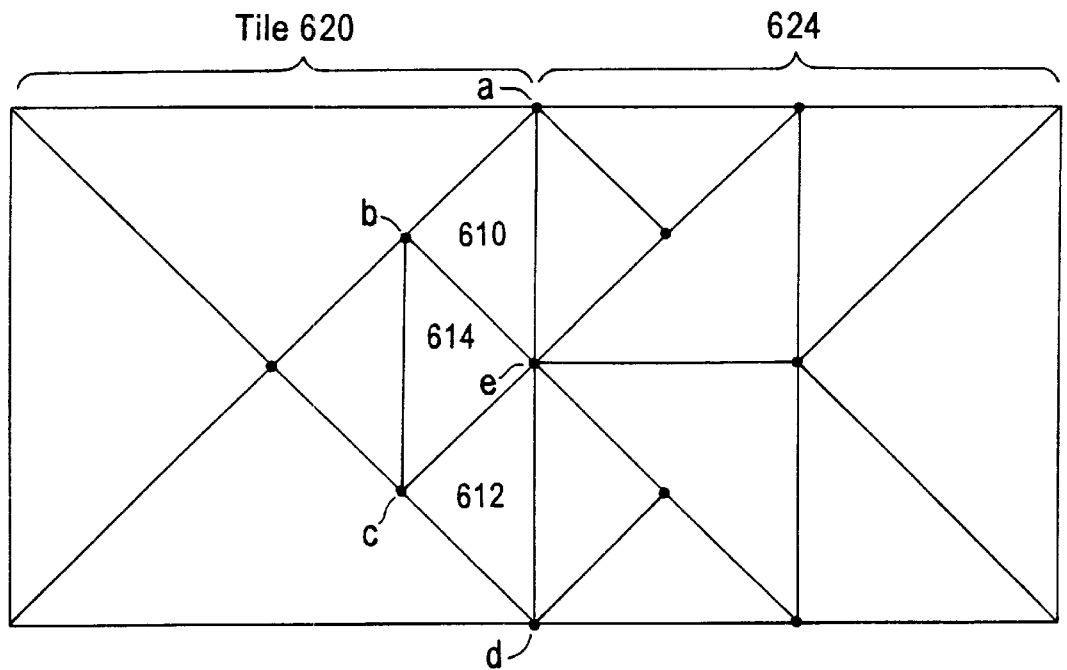
FIG. 6A is a block diagram depicting an exemplary tile and an adjacent tile at the same level of detail.
Figure 6B:
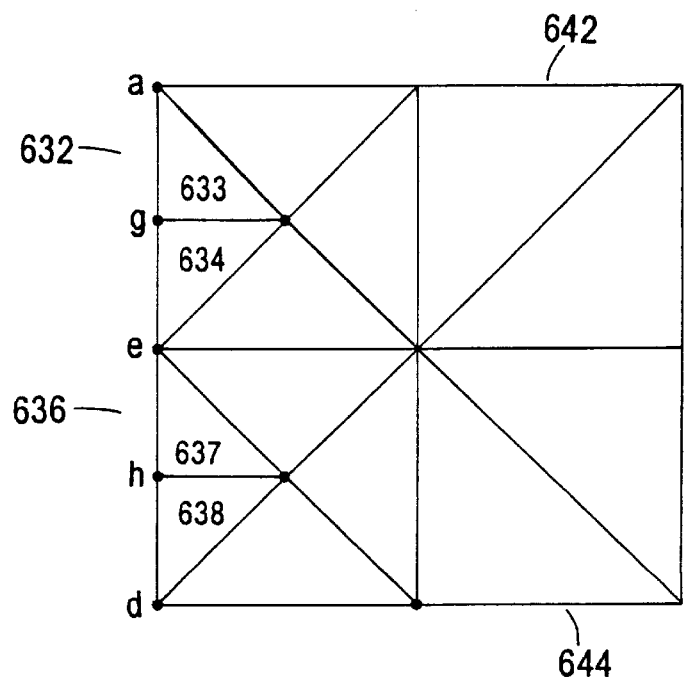
FIG. 6B is a block diagram depicting tiles that are another level of detail representation of the adjacent tile depicted in FIG. 6A.

For example, FIG. 6A shows tile 620 and adjacent tile 624, both at level of detail zero. FIG. 6B shows tile 632, tile 636, tile 642, and tile 644 at a level of detail level one. Tile 632, tile 636, tile 642, and tile 644 is a representation of tile 624 at a lower level of detail generated under the quad-tree approach.

Tile 632 and tile 636 are adjacent to tile 620, and share edge a-e-d with tile 620. Points a, g, and e are vertices of polygons in tile 632 (i.e. polygons 633 and 634) that lie on a portion of shared edge a-e-d. Points e, h, and d are vertices of polygons in tile 636 that lie on the portion of shared edge a-e-d.

Figure 6C:
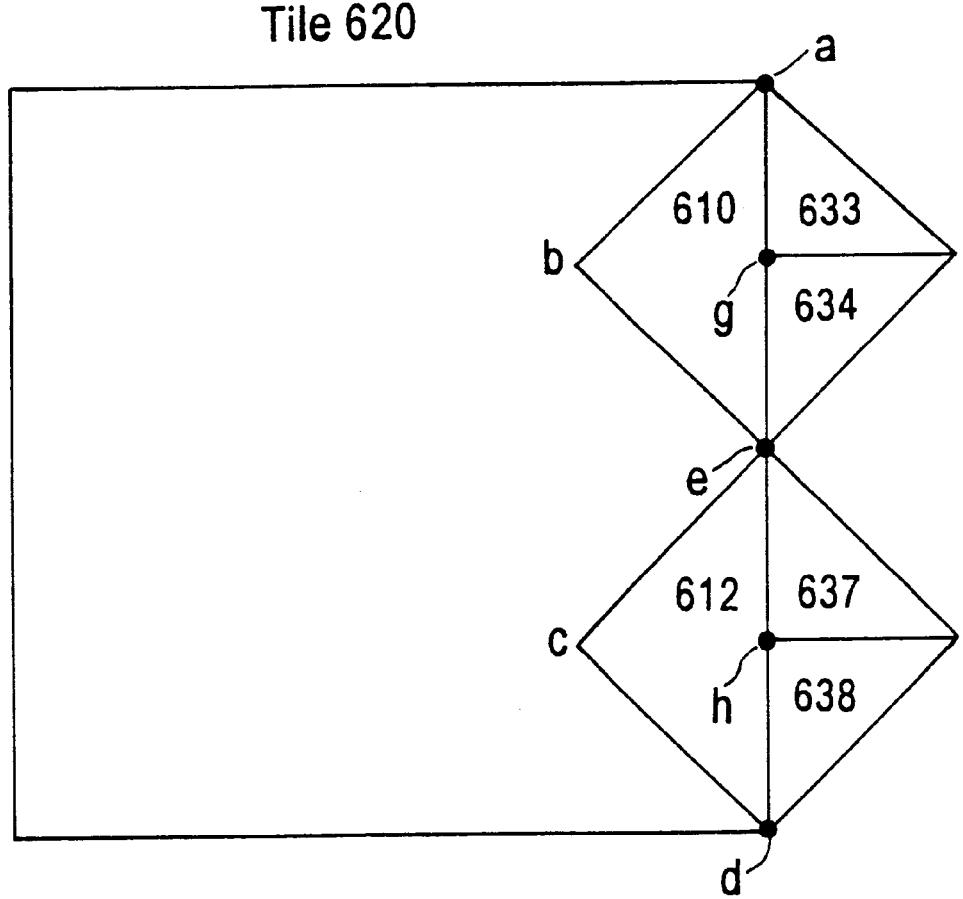
FIG. 6C is a block diagram depicting a set of non-matching polygons.

FIG. 6C shows polygon 610 is a member of the non-matching set with respect to shared edge a-e-d of tile 620 because edge a-e of polygon 610 is broken. In particular, edge a-e is broken because point g, a vertex of polygon 633 and polygon 634 in adjacent tile 632, lies within the end points of edge a-e. Polygon 612 is a member of the non-matching set with respect to edge a-e-d because edge e-d of polygon 612 is broken. In particular, edge e-d is broken because point h, a vertex of polygon 637 and polygon 638 in adjacent tile 636 lies within the end points of edge a-d.

OPERATIONAL EXAMPLE

Figure 7A:
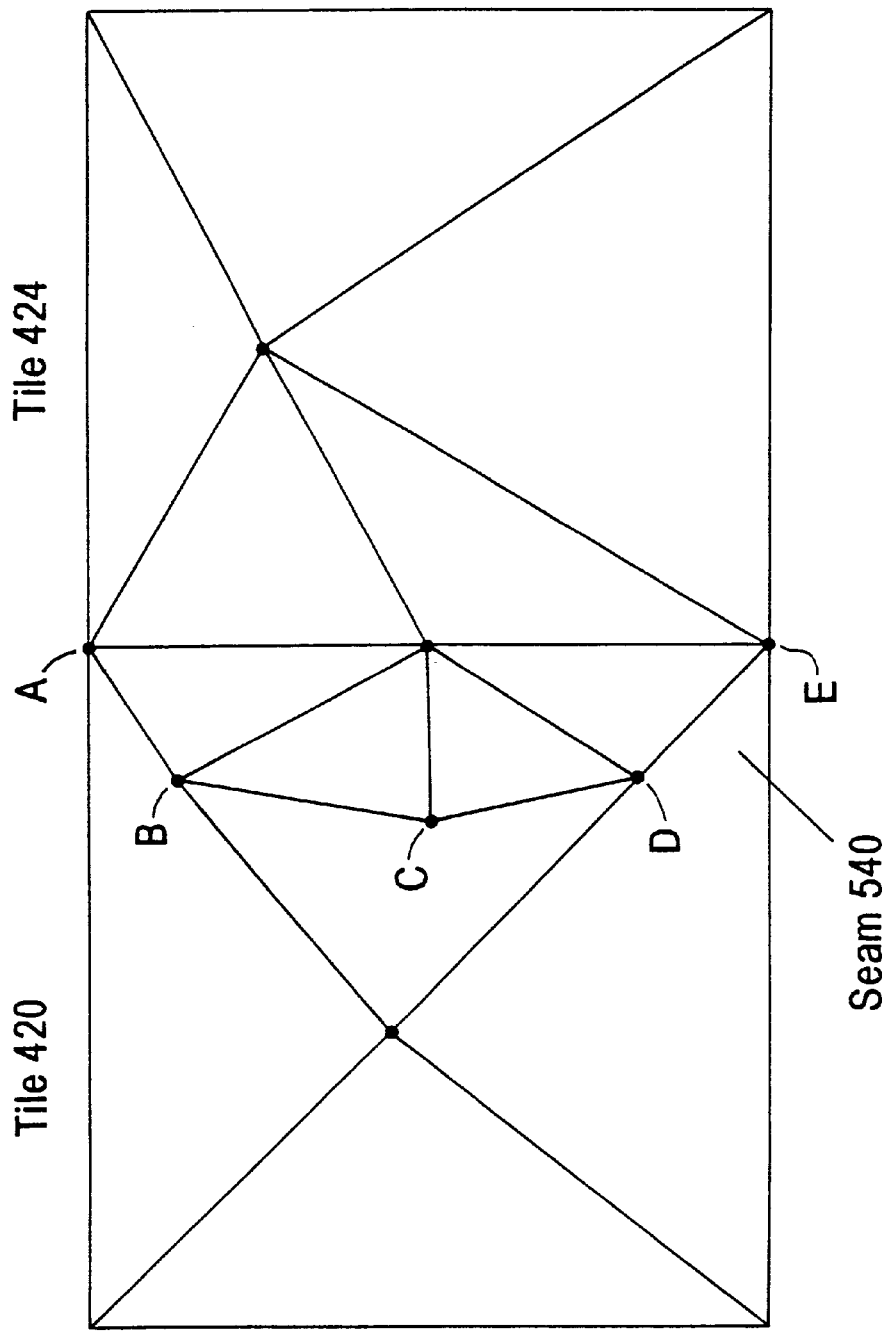
FIG. 7A depicts an exemplary tile and adjacent tile that are displayed when an eye view is at a particular distance.

An operational example shall now be given illustrating the playback, by a playback engine, of terrain made of tiles that contain seam representations generated as described above. FIG. 7A shows tile 420 and tile 424. Based on spatial location and switching data associated with tile 420 and tile 424, and eye view 710, the playback engine has determined that tiles 420 and 424 are to be displayed.

Figure 7B:
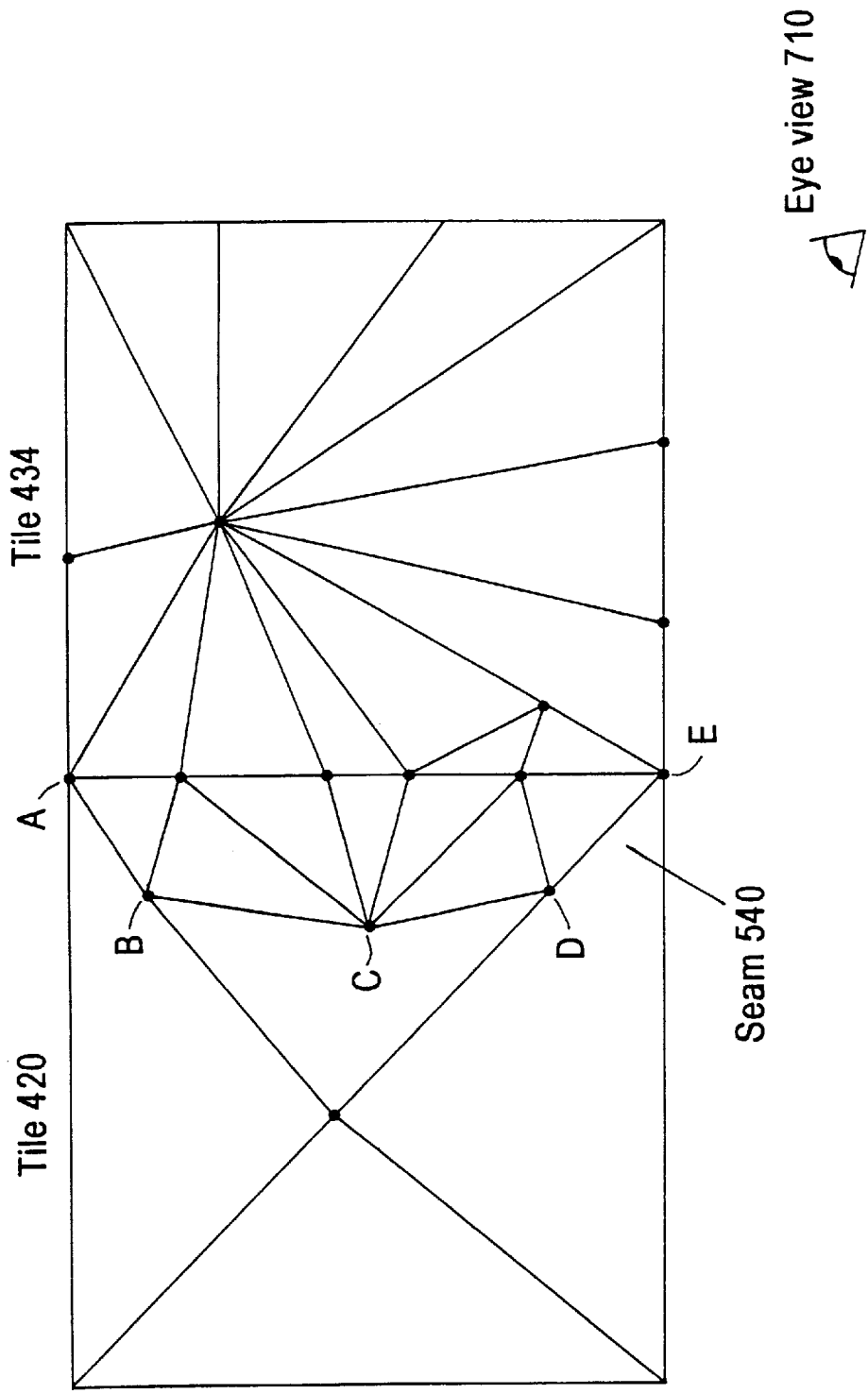
FIG. 7B depicts an exemplary tile, and adjacent tile and seam that are both displayed when a eve view reaches a distance associated with particular spatial location that corresponds to both the adjacent tile and seam.

FIG. 7B shows tile 420 after the eye view 710 moves closer to the region represented by tile 424. The playback engine, based on the spatial location and switching data associated with tile 434, determines that a finer level of detail representation of tile 424 should be displayed. Consequently, tile 434 (which represents at level of detail 1 the same terrain that is represented by tile 424 at level of detail 0) is displayed. Because the level of detail one representation of seam 540 is associated with the same spatial location and switching data values, the playback engine displays the level of detail one representation of seam 540.

It has been found that one advantage of the present invention over conventional methods, such as the uniform points approach, is that seams provide visually smoother transitions between adjacent tiles at different levels of detail. Thus the appearance of walls running through the terrain is reduced. Another advantage is that terrain representations generated in accordance with present invention may played back using playback engines generally available in the market.

While the examples provided herein have been used to illustrate seam representations that bridge a particular tile to a set of one or more adjacent tiles that are at the same level of detail, the present invention is not limited to such an implementation. For example, a seam representation may bridge a particular tile to adjacent tiles that are displayed at two or more different levels of detail.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. In a computer system, a method of generating a graphical representation, the method including the steps of:

generating a first tile that has an edge;

generating a first seam representation for display adjacent to said edge within said first tile;

generating a second seam representation for display adjacent to said edge within said first tile;

selecting seam representations for display adjacent to said edge within said first tile; and wherein said first seam representation and said second seam representation have the same peripheral shape and a different interior configuration.

2. The method of claim 1, further comprising the steps of:

displaying said first seam representation when a second tile is displayed adjacent to said edge; and displaying said second seam representation when a third tile is displayed adjacent to said edge.

3. The method of claim 2, wherein:

the step of displaying said first seam representation when a second tile is displayed adjacent to said edge is performed by displaying said first seam representation when a tile associated with a first level of detail is displayed adjacent to said edge;

the step of displaying said second seam representation when a third tile is displayed adjacent to said edge is performed by displaying said second seam representation when a tile associated with a second level of detail is displayed adjacent to said edge; and the first level of detail is different than said second level of detail.

4. The method of claim 3, wherein:

when the second tile is displayed adjacent to said first tile, said second tile and said first seam representation share a portion of said edge, and all vertices on said portion of said edge are shared by polygons in both said first seam representation and said second tile; and when the third tile is displayed adjacent to said first tile, said third tile and said first seam representation share said portion of said edge, and all vertices on said portion of said edge are shared by polygons in both said second seam representation and said third tile.

5. The method of claim 1, wherein the step of generating a second seam representation includes associating said second seam representation with a level of detail associated with a second tile.

6. The method of claim 5, wherein:

a level of detail is associated with said first tile; and the step of associating said second seam representation with a level of detail includes associating said second seam representation with a level of detail that differs from the level of detail associated with said first tile.

7. The method of claim 5, wherein the step of associating said second seam representation with a level of detail includes associating said second seam representation with switching data and spatial location data associated with said second tile.

8. The method of claim 1, further including the step of determining the peripheral shape based on a set of non-matching polygons with respect to said edge.

9. In a computer system, a method of generating a graphical representation, the method including the steps of:
   generating a seam that has an exterior edge and an interior edge, said exterior edge of said seam coinciding with an edge of a first tile, said interior edge of said seam residing within said first tile;
   generating within said seam a first set of polygons that have vertices on a portion of said exterior edge shared with an adjacent second tile; selecting said seam for display
   generating within said seam a second set of polygons that have vertices on said portion of said exterior edge shared with an adjacent third tile;
   wherein spacing between vertices of said first set of polygons on said portion of said exterior edge is different than spacing between vertices of said second set of polygons on said portion of said exterior edge; and
   wherein said interior edge of said seam has a shape that is the same when said portion of said exterior edge is adjacent to said adjacent second tile and when said portion of said exterior edge is adjacent to said adjacent third tile.

10. The method of claim 9, further including the steps of:
    generating said adjacent second tile at a first level of detail; and
    generating said adjacent third tile at a second level of detail that differs from said first level of detail.

11. The method of claim 10, further including the step of generating said first tile at said first level of detail.

12. The method of claim 10, wherein the step of generating within said seam a second set of polygons includes generating a second set of polygons corresponding to said second level of detail.

13. A computer-readable medium carrying one or more sequences of one or more instructions for generating a graphical representation, wherein the execution of the one or more sequences of the one or more instructions causes the one or more processors to perform the steps of:
    generating a first tile that has an edge;
    generating a first seam representation for display adjacent to said edge within said first tile;
    generating a second seam representation for display adjacent to said edge within said first tile;
    selecting seam representations for display adjacent to said edge within said first tile; and
    wherein said first seam representation and said second seam representation have the same peripheral shape and a different interior configuration.

14. The computer-readable medium of claim 13, further comprising sequences of instructions for performing the steps of:
    displaying said first seam representation when a second tile is displayed adjacent to said edge; and
    displaying said second seam representation when a third tile is displayed adjacent to said edge.

15. The computer-readable medium of claim 14, wherein:
    the step of displaying said first seam representation when a second tile is displayed adjacent to said edge is performed by displaying said first seam representation when a tile associated with a first level of detail is displayed adjacent to said edge;
    the step of displaying said second seam representation when a third tile is displayed adjacent to said edge is performed by displaying said second seam representation when a tile associated with a second level of detail is displayed adjacent to said edge; and
    the first level of detail is different than said second level of detail.

16. The computer-readable medium of claim 15, wherein:
    when the second tile is displayed adjacent to said first tile, said second tile and said first seam representation share a portion of said edge, and all vertices on said portion of said edge are shared by polygons in both said first seam representation and said second tile; and
    when the third tile is displayed adjacent to said first tile, said third tile and said first seam representation share said portion of said edge, and all vertices on said portion of said edge are shared by polygons in both said second seam representation and said third tile.

17. The computer-readable medium of claim 13, wherein the step of generating a second seam representation includes associating said second seam representation with a level of detail associated with a second tile.

18. The computer-readable medium of claim 17, wherein:
    a level of detail is associated with said first tile; and
    the step of associating said second seam representation with a level of detail includes associating said second seam representation with a level of detail that differs from the level of detail associated with said first tile.

19. The computer-readable medium of claim 17, wherein the step of associating said second seam representation with a level of detail includes associating said second seam representation with switching data and spatial location data associated with said second tile.

20. The computer-readable medium of claim 13, further comprising sequences of instructions for performing the step of determining the peripheral shape based on a set of non-matching polygons with respect to said edge.

21. A computer-readable medium carrying one or more sequences of one or more instructions for generating a graphical representation, wherein the execution of the one or more sequences of the one or more instructions causes the one or more processors to perform the steps of:
    generating a seam that has an exterior edge and an interior edge, said exterior edge of said seam coinciding with an edge of a first tile, said interior edge of said seam residing within said first tile;
    generating within said seam a first set of polygons that have vertices on a portion of said exterior edge shared with an adjacent second tile;
    generating within said seam a second set of polygons that have vertices on said portion of said exterior edge shared with an adjacent third tile; selecting said seam for display
    wherein spacing between vertices of said first set of polygons on said portion of said exterior edge is different than spacing between vertices of said second set of polygons on said portion of said exterior edge; and wherein said interior edge of said seam has a shape that is the same when said portion of said exterior edge is adjacent to said adjacent second tile and when said portion of said exterior edge is adjacent to said adjacent third tile.

22. The computer-readable medium of claim 21, further including sequences of instructions for performing the steps of:

generating said adjacent second tile at a first level of detail; and generating said adjacent third tile at a second level of detail that differs from said first level of detail.

23. The computer-readable medium of claim 22, further including sequences of instructions for performing the step of generating said first tile at said first level of detail.

24. The computer-readable medium of claim 22, wherein the step of generating within said seam a second set of polygons includes generating a second set of polygons corresponding to said second level of detail.

* * * * *